Oct. 6, 1964     A. BOUWERS     3,151,524
PANORAMIC OBJECTIVE
Filed May 15, 1961
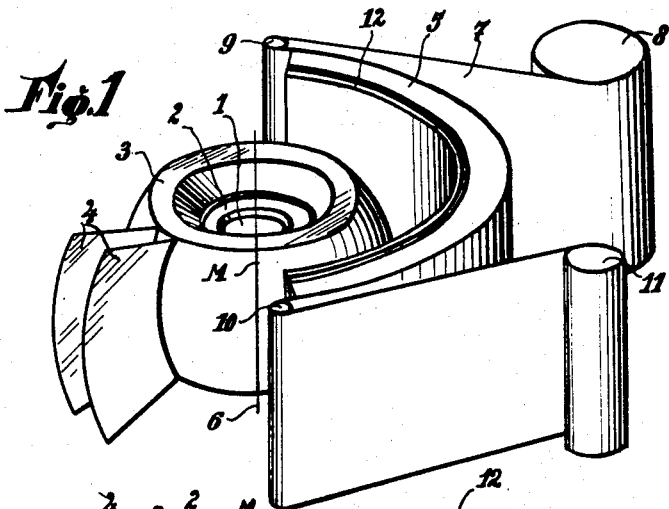
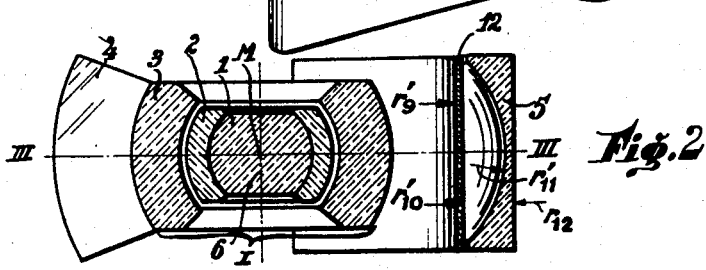
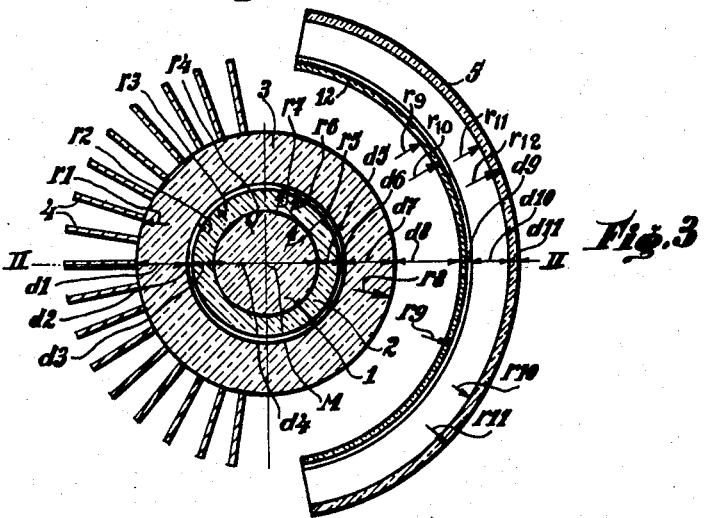
INVENTOR.
ALBERT BOUWERS
BY
ATTORNEYS

United States Patent Office 3,151,524
Patented Oct. 6, 1964

3,151,524
PANORAMIC OBJECTIVE
Albert Bouwers, The Hague, Netherlands, assignor to N.V. Optische Industrie de Oude Delft, Delft, Netherlands
Filed May 15, 1961, Ser. No. 109,906
Claims priority, application Netherlands, May 24, 1960, 251,955
2 Claims. (Cl. 88—57)

The invention relates to panoramic objectives, i.e. objectives whose field angle is substantially larger in one direction than in the direction perpendicular thereto. More specifically, the invention relates to an objective of this type which comprises a system of lenses whose refractive surfaces are spherical and have a common center of curvature, as well as a lens placed between said lens system and the image surface of the objective which lens has at least one concave-torical refractive surface and corrects for the image curvature in the direction of the smallest field angle. An objective of this type is described in the French patent specification 1,173,277.

A system of lenses of which all refractive surfaces are concentric will be termed herein a "concentric system." As is well-known such a system has an image surface which is likewise spherical and concentric with the lens system. If used for photography or projection such systems are disadvantageous in that the film or, more generally, the image carrier, must be curved spherically. This is difficult if the field angle is considerable in two directions perpendicular to each other. According to the French patent specification 1,173,277 the film is applied to the cylindrical outer surface of an annular lens whose inner surface is concave-toric in shape, the outer surface coinciding with the image surface of the objective.

In a concentric system each principal ray, i.e. each light ray passing through the center of the system, may be said to be an optical axis of the system. Thus, the only monochromatic aberration existing in such systems is spherical aberration and all points of the image have identical definition. If, however, a torical lens is added to the system the symmetry in the direction of the smallest field angle is destroyed. The torical surface introduces asymmetry errors in oblique beams which reduce the useful smallest field angle.

Investigations have shown that most of the disturbing effect is caused by the diffusion in meridional direction of the light rays in the sagittal section of the beam. This aberration may be termed the meridional component of sagittal coma. The error appears as a difference in height of incidence in the image surface between those light rays in the sagittal section of the beam which are near the principal ray and those which are near the periphery of the beam. The terms "meridional" and "sagittal" are to be understood in the sense common in the optical art, i.e. as indicative of the plane containing the optical axis and the principal ray of an oblique beam, and of the plane through the principal ray perpendicular to the meridional plane, respectively. It is pointed out, that lens systems of the type indicated may be said to have an infinite number of optical axes since each line passing through the center of curvature of the system of concentric lenses and lying in the radial plane dividing the smallest field angle into halves is, in principle, an optical axis of the system.

In accordance with the invention the asymmetry errors in panoramic objectives of the type indicated may be effectively reduced by providing between the concentric lens system and the torical lens a lens having cylindrical or substantially cylindrical refractive surfaces whose axes of revolution coincide and pass through the center of the concentric lens system.

The cylindrical lens added in accordance with the invention is located a short distance from the image surface and may be relatively thin in practical cases. Accordingly, the contributions of the lens to meridional coma and spherical aberration appear to be negligibly small. Thus, the cylindrical lens proves to be a simple and cheap aid to considerably enlarge the useful image field in the direction of the smallest field angle.

The invention will be described in detail in the following, reference being had to the drawing which shows a particular embodiment of the invention and in which:

FIG. 1 is a perspective view of the panoramic objective together with a photographic roll film;
FIG. 2 a sectional view along the plane II—II of the smallest field angle;
FIG. 3 a sectional view along the plane III—III of the largest field angle.

In FIG. 2, I generally designates a so-called concentric lens system which, in the example illustrated, consists of a core 1 and two rings, an inner ring 2 and an outer ring 3, which are both made up of two halves cemented to each other. The core 1 is a portion of a sphere, the rings 2 and 3 are in the shape of spherical shells which are concentric with the core. The center of the system I is designated M. The core and the rings are made of different optical glasses. The core 1 and the ring 2 are cemented to each other. The horizontal field angle of the objective is 150°, the vertical filed angle is 40°. It will be understood that the concentric lens system I can be devised in various ways different from the construction shown. For instance, the number of internal refractive surfaces may be larger or smaller than illustrated. All of these surfaces may be cemented or may be separated by air gaps. The core can be made up of a number of cemented parts of equal refractive indices or may consist of a liquid. The system may be asymmetric relative to a horizontal plane through the center M, such that M is not in the middle of the glass core but more upward or downward or even completely outside of the glass body. The French patent specification 1,173,277 gives some examples for these possibilities. The only principal point is that the refractive surfaces of the system I have their centers of curvature coinciding in M.

A number of radial blades 4 act as a diaphragm whose purpose is to limit the aperture of the objective in the plane of the largest field angle. A full discussion of their function has been given in the said French patent specification 1,173,277.

The concentric lens system I is corrected for spherical and chromatic aberration. Asymmetry errors, such as coma and astigmatism, are absent. The only uncorrected aberration of the system I is field or image curvature. The image surface is spherical, having M for its center.

In order to avoid the well-known complications of a spherical image surface the semi-annular lens 5 is added which corrects for the field curvature in vertical direction. The outer surface of the lens 5 is a cylinder having the vertical through the center M for its axis of rotation. This outer surface coincides with the corrected image surface and serves as a support for the portion of a photographic film 7 which is to be exposed. The film is unrolled from a supply spool 8 and via guiding rollers 9 and 10 fed to a take-up spool 11.

The inner surface of the lens 5 is concave-toric. Thus, the lens is thicker at its upper and lower edges than in the middle part. It thereby introduces a difference in optical path length between rays which form the image points at the upper and lower edges of the image and the rays corresponding to image points near the horizontal symmetry plane III—III. The short radius of curvature $r'_{10}$ (see FIG. 2) of the torical surface which is required to produce the desired compensation of field curvature may be computed in accordance with rules well-known from the theory of rotation-symmetrical field flattening lenses.

The torical surface of the lens 5 is located very near the image surface. Thus, the coma introduced by this surface (meridional coma) is small. The same holds for the spherical aberration. As explained above, the useful vertical field angle is seriously limited, however, by the large meridional component of sagittal coma, an error which is generally negligibly small in the usual rotation-symmetrical optical systems. This aberration may also conveniently be described as a difference in aequivalent focal length of the system for rays in the sagittal plane which travel near the meridional plane and marginal rays which are widely separated therefrom. This leads to a difference in magnification between such light rays and, consequently, to different heights of incidence in the image surface.

In order to compensate for this error a cylindrical lens 12 is added whose refractive surfaces have the axis 6 through the center M for their common axis of revolution. The lens is disposed between the concentric lens system I and the torical lens 5. It appears that this lens is very effective on sagittal coma without impairing to a noticeable degree the remaining aberrations.

It will be understood that small deviations from the exact cylindrical shape in such a sense that the surfaces of the lens are made slightly toric are perfectly feasible and within the scope of the present invention. The invention provides the possibility to obtain a very satisfactory result by applying a single element of a shape which is as simple as possible.

In the following Table I numerical data are given of an embodiment of the objective according to FIGS., 2 and 3, $n_{subscript}$ designating the radius of curvature of the refractive surface in the plane of the largest field angle, $r'_{subscript}$ designating the radius of curvature of the refractive surface in the plane of the smallest field angle, $d_{subscript}$ the lens thickness or air gap between lenses, $n_{d\ subscript}$ the index of refraction of the lens materials for the $d$-line of the spectrum and $v_{subscript}$ the Abbe number of the lens materials, all subscripts increasing in the direction from the long conjugate to the short conjugate side of the objective.

Table I

[$f=100$; relative aperture~1/2.8; field 40° x 150°]

| Radius of curvature $r$ or $r'$ | Thickness or air gap $d$ | Refractive index $n_d$ | Abbe number $v$ |
|---|---|---|---|
| $r_1 = 51.7$ | $d_1 = 20.6$ | $n_{d_1} = 1.670$ | $v_1 = 47.2$ |
| $r_2 = 31.1$ | $d_2 = 2.0$ | air | |
| $r_3 = 29.1$ | $d_3 = 8.5$ | $n_{d_3} = 1.722$ | $v_3 = 29.3$ |
| $r_4 = 20.6$ | $d_4 = 41.2$ | $n_{d_4} = 1.501$ | $v_4 = 56.5$ |
| $r_5 = -20.6$ | $d_5 = 8.5$ | $n_{d_5} = 1.722$ | $v_5 = 29.3$ |
| $r_6 = -29.1$ | $d_6 = 2.0$ | air | |
| $r_7 = -31.1$ | $d_7 = 20.6$ | $n_{d_7} = 1.670$ | $v_7 = 47.2$ |
| $r_8 = -51.7$ | $d_8 = 25.3$ | air | |
| $r_9 = -77.0$ | $d_9 = 3.0$ | $n_{d_9} = 1.651$ | $v_9 = 58.4$ |
| $r_{10} = -80.0$ | $d_{10} = 17.0$ | air | |
| $r_{11} = -97.0$ | $d_{11} = 3.0$ | $n_{d_{11}} = 1.734$ | $v_{11} = 50.8$ |
| $r_{12} = -100.0$ | | | |
| $r'_9 = \infty$ | | | |
| $r'_{10} = \infty$ | | | |
| $r'_{11} = 46.8$ | | | |
| $r'_{12} = \infty$ | | | |

What I claim is:

1. A panoramic objective, comprising a concentric system of lenses having solely spherical refractive surfaces which have a common center of curvature, and a field flattening lens placed between said concentric system of lenses and the image surface of said objective as near as practicable to the image surface and being corrective for field curvature in the direction of the smallest field angle, whereby the image surface is substantially of cylindrical shape, said field flattening lens causing substantial confusion in meridional direction of rays in the saggital section of light pencils that are oblique with respect to the plane through said common center of curvature and bisecting the smallest field angle, and between said concentric lens system and said field flattening lens a further lens having substantially cylindrical refractive surfaces whose axes of revolution coincide and pass through said common center of curvature, said further lens being effective in correcting for said diffusion of rays of said oblique pencils.

2. A panoramic objective as claimed in claim 1 which has the following data:

[$f=100$; relative aperture~1/2.8; field 40° x 150°]

| Radius of curvature $r$ or $r'$ | Thickness or air gap $d$ | Refractive index $n_d$ | Abbe number $v$ |
|---|---|---|---|
| $r_1 = 51.7$ | $d_1 = 20.6$ | $n_{d_1} = 1.670$ | $v_1 = 47.2$ |
| $r_2 = 31.1$ | $d_2 = 2.0$ | air | |
| $r_3 = 29.1$ | $d_3 = 8.5$ | $n_{d_3} = 1.722$ | $v_3 = 29.3$ |
| $r_4 = 20.6$ | $d_4 = 41.2$ | $n_{d_4} = 1.501$ | $v_4 = 56.5$ |
| $r_5 = -20.6$ | $d_5 = 8.5$ | $n_{d_5} = 1.722$ | $v_5 = 29.3$ |
| $r_6 = -29.1$ | $d_6 = 2.0$ | air | |
| $r_7 = -31.1$ | $d_7 = 20.6$ | $n_{d_7} = 1.670$ | $v_7 = 47.2$ |
| $r_8 = -51.7$ | $d_8 = 25.3$ | air | |
| $r_9 = -77.0$ | $d_9 = 3.0$ | $n_{d_9} = 1.651$ | $v_9 = 58.4$ |
| $r_{10} = -80.0$ | $d_{10} = 17.0$ | air | |
| $r_{11} = -97.0$ | $d_{11} = 3.0$ | $n_{d_{11}} = 1.734$ | $v_{11} = 50.8$ |
| $r_{12} = -100.0$ | | | |
| $r'_9 = \infty$ | | | |
| $r'_{10} = \infty$ | | | |
| $r'_{11} = 46.8$ | | | |
| $r'_{12} = \infty$ | | | | wherein $r_{subscript}$ designates the radius of curvature of the refractive surface in the plane of the largest field angle, $r'_{subscript}$ the radius of curvature of the refractive surface in the plane of the smallest field angle, $d_{subscript}$ the lens thickness or air gap between lenses, $n_{d\ subscript}$ the index of refraction of the lens material for the $d$ line of the spectrum and $v_{subscript}$ the Abbee number of the lens material, all subscripts increasing in the direction from the long conjugate to the short conjugate side of the objective.

References Cited in the file of this patent

UNITED STATES PATENTS 2,522,390     McCarthy     Sept. 12, 1950
2,923,220     Bouwers     Feb. 2, 1960